United States Patent Office 3,498,949
Patented Mar. 3, 1970

3,498,949
HIGH-TEMPERATURE RESISTANT POLYMERS WHICH CONTAIN SILICON AND NITROGEN AND METHOD OF MAKING
Walter Fink, Zurich, Switzerland, assignor to Monsanto Company, St. Louis, Mo., a corporation of Delaware
No Drawing. Filed Nov. 25, 1966, Ser. No. 596,824
Claims priority, application Switzerland, Dec. 1, 1965, 16,649
Int. Cl. C08g 31/30
U.S. Cl. 260—46.5                  8 Claims

ABSTRACT OF THE DISCLOSURE

Cyclodisilazane polymers of the formula

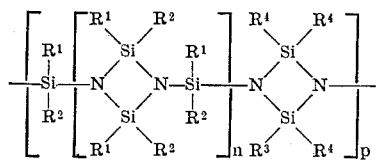

method of making by heating a compound of the formula

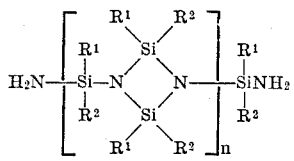

and a compound of the formula $R^3R^4SiH_2$ in the presence of a catalyst which is an alkali or alkaline earth metal or metal hydride, and pyrolyzed polymers of the first formula above.

---

The present invention relates to high-temperature resistant polymers which contain silicon and nitrogen and to a process for preparing the polymers. The polymers comprise units having the formula (A)

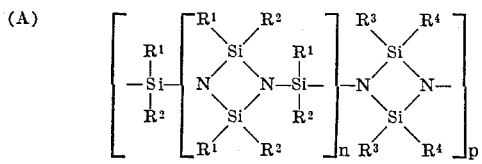

in which $R^1$ and $R^2$, taken singly, are similar or different and signify hydrogen atoms, fluorine atoms, possibly substituted and/or unsaturated hydrocarbon groups of heterocyclic groups, silyl groups of the formula $$SiR^*_3, \ SiR^*_2SiR^*_3, \ SiR^*_2OSiR^*_3$$

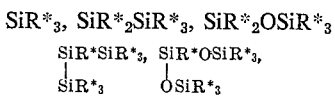

$Si(SiR^*_3)_3$, $Si(OSiR^*_3)_3$, or $SiR^*_2(OSiR^*_2)_aOSiR^*_3$ ($R^*$=F or organic group possibly linked through 0; $a$=1-10), phosphorus groups of the formula $PR^*_2$, $P(O)R^*_2$ or $P(S)R^*_2$, boron groups of the formula $BR^*_2$ or cyano group, and these groups may also be linked through an oxygen atom to the silicon atom; $R^3$ and $R^4$ are in principle defined as $R^1$ and $R^2$, and they can also be attached via a nitrogen atom, an NR'— group or NR"— group (R'=silyl group; R"=organic group) to the silicon atom instead of an oxygen atom; $R^1$ and $R^2$, or $R^3$ and $R^4$, taken together, signify with their silicon atom a silacycloalkyl group which can contain up to 11 methylene units, which units may be interrupted by hetero atoms or hetero atoms groups such O, S, $S_2$, SO, $SO_2$, NH, NR', NR", $NSiR^*_3$ or $SiR^*_2$ (R', R" and R*=as above), $p$ represents the degree of polymerization and $n$ represents an integer of 1 to 10. Normally, each R group has not more than 24 carbon atoms and for some purposes preferably has not more than 8 carbon atoms.

Previously, polymers with cyclodisilazane units, whose ring nitrogen atoms are linked through silicon atoms, have not been known. The polymers of the invention display an extraordinary temperature resistance. They may be utilized instead of many hitherto known polymers and provide added advantages.

It has now been found that one obtains the polymers formulated at the beginning, if a bis-(aminosiyl)-cyclodisilazane of the general formula (B)

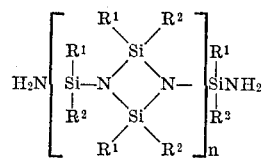

in which $R^1$, $R^2$ and $n$ are defined as above, and a hydrosilane of the general formula (C)                 $R^3R^4SiH_2$ in which $R^3$ and $R^4$ are defined as above, are brought to reaction preferably in molar proportion of at least about 1:2 in the presence of a catalyst.

The bis-(aminosiyl)-cyclodisilazanes (B) serving as starting products are available by, for example, the exchange of the halogen atoms for ammonia in bis-(chlorosilyl) - cyclosilazanes. Bis - (dimethyl-chlorosilyl)tetramethylcyclodisilazane is a known compound. It can be prepared by heating either hexamethylcyclotrisilazane or octamethylcyclotetrasilazane with dimethyldichlorosilane (ratio 1:3 or 1:4 resp.) in the presence of an acid-binding agent (triethylamine), or by heating 1,3-dichloro-tetramethyldisilazane in the presence of an acid-binding agent. Other compounds of this class can be prepared in similar manner.

The condensed bis - (dimethl-chlorosilyl)-tetramethylcyclodisilazane having up to 10 ring atoms can be prepared by heating hexamethylcyclotrisilazane or octamethylcyclotetrasilazane with dimethyldichlorosilane (ratio 1:1 to 1:2) at higher temperatures (280° to 350° C.). The individual condensation products can be isolated, e.g., by fractional distillation or be used as a mixture. Other compounds of this class can be prepared in similar manner.

The exchange of halogen for $NH_2$ can be realized by simple treatment with $NH_3$. After having removed the ammonium chloride, the resulting compound B can directly be subjected to the reaction of invention.

Examples for the groups $R^1$ to $R^4$ as they can occur attached to silicon atoms, are fluorine atoms, alkyls, alkenyls and alkynyls such as methyl, ethyl, vinyl, ethynyl, n-propyl, iso-propyl, allyl, propenyl, propargyl, propynyl, n-butyl, iso-butyl, sec-butyl, tert-butyl, methallyl, 1-butenyl, crotyl, butadienyl, 1-butynyl, 2-butynyl, 1-buten-2-ynyl and higher aliphatic groups having up to 24 carbon atoms such as undecenyl, dodecyl, myristyl, oleyl and tetracosyl; moreover cycloalkyls, cycloalkenyls and cycloalkynyls such as cyclobutyl, cyclopentyl, cyclopentenyl, cyclopentadienyl, cyclohexyl, cyclohexenyl, cyclohexadienyl, cyclohexynyl, and greater alicyclic groups having up to 12 carbon atoms such as cyclooctyl, cyclododecyl, cyclooctatrienyl, cyclododecatrienyl and bicyclohexyl; moreover, aralkyls, aralkenyls and aralkynyls such as benzyl, cuminyl, phenylethyl, styryl, phenylethynyl, phenylpropyl, 3-phenylallyl, 2-phenylallyl, 1-phenylallyl, cinnamyl, 1-phenylpropynyl, 1-phenylpropargyl, diphenylmethyl, triphenylmethyl, α-naphthylmethyl, β-naphthylmethyl, 1-(α-naphthyl)ethyl, 2-(α-naphthyl)ethyl, 1-(β-naphthyl)ethenyl, 2 - (β - naphthyl)ethyl, 1-(α-naphthyl)ethenyl, 2-(α-naphthyl)ethenyl, 1-(β- naphthyl)ethenyl, 2-(β-naphthyl)ethenyl, α-naphthylethynyl and β-naphthylethynyl; moreover, alkaryls, alkenylaryls and alkynylaryls such as tolyl, xylyl, mesityl, duryl, ethylphenyl, cumyl, vinylphenyl, ethynylphenyl, propargylphenyl, propynylphenyl, tert-butylphenyl, α-vinylnaphthyl, β-vinylnaphthyl, α-ethynylnaphthyl and β-ethynylnaphthyl; moreover, aryls such as phenyl, o-biphenylyl, m-biphenylyl, p-biphenylyl, m-terphenylyl, p-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl, indanyl and indenyl; moreover, heterocyclic groups such as pyrryl, furyl, tetrahydrofuryl, benzofuryl, thienyl, pyrrolinyl, pyrrolidyl, pyrazolyl, pyrazolinyl, pyrazolidyl, imidazolyl, imidazolidyl, benzimidazolyl, thiazolyl, oxazolyl, isooxazolyl, triazolyl, pyrazinyl, pyrimidyl, pyridazinyl, pyridyl, pyranyl, thiopyranyl, piperidyl, morpholinyl, thiazinyl, triazinyl, quinolyl, quinazolyl, indolyl, phenazinyl, carbazolyl, and the like.

The simplest representatives of starting compounds are 1,3-bis-(amino-dimethylsilyl)-2,2,4,4-tetramethyl-1,3,2,4-diazadisiletidine, 1,3-bis-(amino-diphenylsilyl)-2,2,4,4-tetraphenyl-1,3,2,4-diazadisiletidine and 1,3-bis-[1-aminosilacyclopentyl-(1)]-2,4-bis-[silacyclopentyl-(1)]-2,4-dimethyl-1,3,2,4-diazadisiletidine In the last mentioned compound, $R^1$ and $R^2$, or $R^3$ and $R^4$ form together with their silicon atom a silacycloalkyl group. Further examples for such groups are silacyclobutyl, silacyclopentenyl, silacyclohexyl, silacyclohexenyl, silacyclohexadienyl, silacycloheptyl, silacycloheptenyl, silacycloheptadienyl and silacycloheptatrienyl.

In analogous compounds, other organic groups or a combination of the above enumerated organic groups can replace, e.g., methyl. Moreover, the compounds may also show a combination of organic groups and fluorine atoms, such as, e.g., in the compound 1,3-bis-(amino-fluorophenylsilyl)-2,2,4-tetramethyl-1,3,2,4-diazadisiletidine.

It has also been found that the enumerated hydrocarbyl groups and heterocyclic groups may also show substituents which do not hinder the reaction of invention. Examples for such substituents are Cl, Br, I, F, —OR″, —SR″, —SiR*$_3$, —SiR*$_2$OSiR*$_3$, —BR*$_2$, —P(O)R*$_2$,

—P(S)R*$_2$

—CN and —NO$_2$ (R″ and R* are defined as above).

Examples for some halogenated hydrocarbon groups are: chloromethyl, dichloromethyl, trichloromethyl, bromomethyl, dibromoethyl, tribromomethyl, fluoromethyl, difluoromethyl, trifluoromethyl, 1-chloroethyl, 2-chloroethyl, 1-bromoethyl, 2-bromoethyl, 1-fluoroethyl, 2-fluoroethyl, 1,2-dichloroethyl, 1,2-difluoroethyl, 2,2,2-trichloroethyl, 2,2,2-trifluoroethyl, pentafluoroethyl, 2-chlorovinyl, 1-chlorovinyl, 1,2-dichlorovinyl, trichlorovinyl, trifluorovinyl, bromophenyl, fluorophenyl, difluorophenyl, trifluorophenyl, pentafluorophenyl, trichloromethylphenyl and bis(trifluoromethyl)-phenyl. In similar manner also other of the above enumerated hydrocarbon groups and also heterocyclic groups may be halogenated.

Examples of R″O substituents are: methoxy, ethoxy, vinyloxy, n-propoxy, iso-propoxy, 1-propenoxy, 2-propenoxy, iso-propenoxy, n-butoxy, iso-butoxy, sec-butoxy, tert-butoxy, crotoxy, n-amoxy, iso-amoxy, n-octoxy, 10-undecylenoxy, lauroxy, stearoxy, phenylmethoxy, styryloxy, phenylethynyloxy, o-, p- and m-allylphenoxy, phenoxy, toloxy, xyloxy, 3-biphenylyloxy, 2-biphenylyloxy, 4-biphenylyloxy, 1-naphthoxy, 2-naphthoxy and asaroxy. The corresponding thio analogues contain sulfur instead of oxygen. Moreover, also useful are substituents arising from the polymerization of formaldehyde corresponding to the formula R″OCH$_2$(OCH$_2$)$_a$O—, substituents which originate from the addition of ethylene oxide, or propylene oxide, respectively, and subsequent etherification of the terminal OH group corresponding to the formulae R″OCH$_2$CH$_2$(OCH$_2$CH$_2$)$_a$O— and

R″OCH$_2$CH$_2$CH$_2$(OCH$_2$CH$_2$CH$_2$)$_a$O—

(R″ is defined as above: $a=1–10$). Further substituents contain some branched ether groupings such as veratroxy, anisoxy, phenetoxy, 3,4-dimethoxyphenoxy, 3-phenoxy-4-methoxyphenyloxy and wholly aromatic analogues which are derived from the following compounds:

phenoxybenzene,
toloxybenzene,
toloxytoluene,
xyloxyxylene,
2-biphenylylether,
3-biphenylylether,
4-biphenylylether,
2-biphenylyl-4-biphenylylether,
3-biphenylyl-4-biphenylylether,
1-(2-diphenylyloxy)-2-phenoxybenzene,
1-(2-biphenylyloxy)-3-phenoxybenzene,
1-(2-biphenylyloxy)-4-phenoxybenzene,
1-(3-biphenylyloxy)-2-phenoxybenzene,
1-(3-biphenylyloxy)-3-phenoxybenbene,
1-(3-biphenylyloxy)-4-phenoxybenzene,
1-(4-biphenylyloxy)-2-phenoxybenzene,
1-(4-biphenylyloxy)-3-phenoxybenzene,
1-(4-biphenylyloxy)-4-phenoxybenzene,
2,2′-diphenoxybiphenyl,
3,3′-diphenoxybiphenyl,
4,4′-diphenoxybiphenyl,
2,3′-diphenoxybiphenyl,
2,4′-diphenoxybiphenyl,
3,4′-diphenoxybiphenyl,
2,4′-diphenoxybiphenyl,
2,5-diphenoxybiphenyl,
2,6-diphenoxybiphenyl,
3,4-diphenoxybiphenyl,
3,5-diphenoxybiphenyl,
1,2,3-triphenoxybenzene,
1,2,4-triphenoxybenzene,
1,3,5-triphenoxybenzene,
2-phenoxyphenylether,
3-phenoxyphenylether,
4-phenoxyphenylether,
2-phenoxyphenyl-3-phenoxyphenylether,
2-phenoxy-4′-phenoxyphenylether,
3-phenoxyphenyl-4′-phenoxyphenylether,
1-phenoxynaphthalene,
2-phenoxynaphthalene,
1,1′-dinaphthalenether,
2,2′-dinaphthalenether,
1,2′-dinaphthalenether and the like, moreover, longer-chain polyaroxyaryls ArO(ArO)$_2$Ar (Ar=possibly lower-alkyl-substituted phenyl, biphenyl or naphthyl; $a$=as above). Lower-alkyl is defined as not more than 8 carbon atoms. The aroxy groups may be arranged to each other in ortho position, meta position or para position. According to the definition given for $R^1$ to $R^4$ the enumerated groups may also be attached directly to the silicon atom. Moreover, one to several hydrogen atoms may be replaced by fluorine atoms, thereby the termoplasticity of the end products can be increased. Included are corresponding thioethers which possess sulfur instead of oxygen. Examples for some of the simplest representatives of the great class of cyanated and nitrated hydrocarbyl groups are: 2-cyanoethyl, 2-nitroethyl, 2-cyano-n-propyl, 3-cyano-n-propyl, 2,4-dicyano-n-butyl. Ethyl, n-propyl and n-butyl may be replaced by other hydrocarbon groups, as they have been enumerated before for $R^1$ to $R^4$.

Examples for some silyl substituents of the general formula —SiR*$_3$, which may be more closely defined by the general formula —SiR″$_3$ are: trimethylsilyl, tris-(trifluoromethyl)-silyl and other, possibly substituted trihydrocarbylsilyls which contain identical or different saturated or unsaturated alkyls, cycloalkyls, aralkyls or aryls, as they have been named before for $R^1$ and $R^2$, including the silyl groups in which Si is a constituent of a heterocyclic ring, such as in the groups silacyclopentyl, silacyclopentenyl, silacyclohexyl, silacyclohexenyl, silacyclohexadienyl, etc. or which may be more closely defined by the general formulae $-SiF_3$, $-SiF_2R''$ and $-SiF(R'')_2$, are: trifluorosilyl, methyldifluorosilyl, dimethylfluorosilyl, phenyldifluorosilyl, diphenylfluorosilyl and other hydrocarbyl difluorosilyl groups or bis-(hydrocarbyl)-fluorosilyl groups containing the above mentioned hydrocarbyl groups or which may be more closely defined by the general formula $-Si(OR'')_3$, $-SiF_2OR''$ and $-SiF(OR'')_2$, are: trimethoxysilyl, difluoro-methoxysilyl, dimethoxyfluorosilyl, triphenoxysilyl, phenoxydifluorosilyl, diphenoxyfluorosilyl and other tris-(hydrocarbonoxy)-silyls, bis-(hydrocarbonoxy)-fluorosilyls and hydrocaronoxydifluorosilyls which contain identical or different, saturated or unsaturated alkoxyls, cycloalkoxyls, aralkoxyls, alkaroxyls or aroxyls as they have been indicated before for $-OR''$, of which finally may be more closely defined by the general formulae $$-Si(OR'')_2R''$$

and $-Si(OR'')R''_2$, are: methyl-dimethoxysilyl, dimethyl-methoxysilyl and analogues, which possess a combination of other organic groups, as they have been enumerated before.

The silyl groups may be attached through oxygen and thus correspond to the general formula $-OSiR'_3$. Some simple representatives are trifluorosiloxy, trimethylsiloxy, trimethoxysiloxy, triphenylsiloxy, triphenoxysiloxy, dimethylmethoxysiloxy, methyl-dimethoxysiloxy, phenyldiphenoxysiloxy, diphenyl-phenoxysiloxy, dimethyl-phenoxysiloxy, phenyl-dimethoxysiloxy and analogues, which possess a combination of other organic groups, as they have been enumerated before.

The simplest representatives of the substituents showing Si—Si— or Si—O—Si bonds are:

pentamethyldisilanyl,
1-trimethylsilyl-tetramethyldisilanyl,
1,1-bis-(trimethylsilyl)-trimethyldisilanyl,
pentamethoxydisilanyl,
pentamethoxydisiloxanyl,
1-trimethoxysilyl-tetramethoxydisiloxanyl and
1,1-bis-(trimethoxysilyl)-trimethoxydisiloxanyl.

Analogous substituents may contain other organic groups such as they have been enumerated for $R^1$ and $R^2$ or fluorine atoms instead of methyl.

According to the definition given at the beginning these silyl groups may also be attached directly to the silicon atoms of the disilylcyclodisilazane.

As further reaction component is used here, a hydrosilane (C). In technical literature numerous hydrosilanes or halosilanes are known from which the first named can be prepared by reduction. The simplest representatives which are suitable for the execution of the invention are $SiH_4$, $SiFH_3$, $SiF_2H_2$ and the organically substituted derivatives such as $MeSiH_3$, $Me_2SiH_2$, $MeOSiH_3$, $$(MeO)_2SiH_2$$

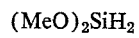

$PhMeSiH_3$, $Ph_2SiH_2$, $PhOSiH_3$, $(PhO)_2SiH_2$, $MePhSiH_2$, $MeO(Ph)SiH_2$, $Me(PhO)SiH_2$, $MeO(PhO)SiH_2$ and analogous hydrosilanes, which contain other organic groups, as they have been enumerated for $R^1$ to $R^4$, instead of methyl, or phenyl, respectively. The hydrosilanes may also show a combination of organic groups and a fluorine atom, such as, e.g., $F(Ph)SiH_2$ and $F(PhO)SiH_2$. In principle, any silane may be utilized which contains at least two hydrogen atoms attached to the silicon atoms.

The reaction of invention proceeds according to the equation:

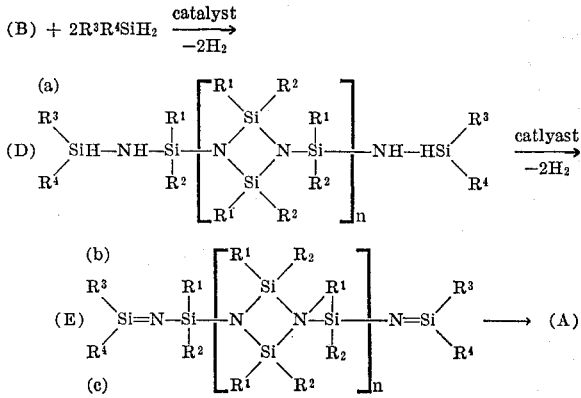

The reaction probably proceeds via the intermediate compound (D) and furthermore via the unstable intermediate compound (E) which immediately polymerizes to the end product (A). Hydrogen is evolved as sole by-product.

Alkali metals and their hydrides are especially suitable as catalysts. If one uses an alkali metal, its hydride is formed during the reaction.

Whereas, the choice of substituents, as they can occur in the groups $R^1$ and $R^2$, will be subjected to a certain restriction depending on the applied method of preparing the starting compounds (B), many more kinds of substituents can occur in the reaction component (C). Besides the before enumerated substituents (Cl, Br and I excepted, the following substituents may be considered for the groups $R^3$ and $R^4$:

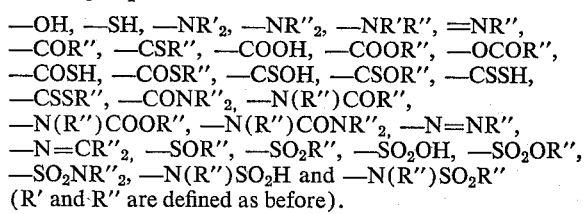

(R' and R'' are defined as before).

Examples for some acyl substituents having the general formula—$COR''$, are:

acetyl, n-propionyl, iso-propionyl, acrylyl, crotonyl, propiolyl, n-butyryl, iso-butyryl, valeryl, pivalyl, enanthyl, caprylyl, lauroyl, myristoyl, oleoyl, stearoyl, phenylacetyl, diphenylacetyl, cinnamoyl, benzoyl, naphthoyl, cumoyl, 4-biphenylylcarbonyl, anisoyl, phenetoyl, veratroyl, 2,3,4-, 1,4,5- and 3,4,5-trimethoxybenzoyl, p-diphenylaminobenzoyl, cyanoacetyl, trimethylsilylanthranoyl, methoxyacetyl, dimethylaminoacetyl, trimethylsilylamino-acetyl, bis-(triphenylsilyl)-aminoacetyl, trimethylsiloxyacetyl, trichloroacetyl, trifluoroacetyl, 2-furoyl, 3-furoyl, pyrroyl,
including the thio analogues, which correspond to the general formula —$CSR''$.

Examples of sulfinyl and sulfonyl substituents are those groups which contain a —SO— or —$SO_2$— group in the place of the —CO— group shown in the formula above and consequently correspond to the general formulae —$SOR''$ and —$SO_2R''$. These groups can occur in the hydrocarbyl groups several times, as well as the carbonyl groups.

Examples of some ester substituents showing the general formula —$COOR''$ are:

carbomethoxy, carbethoxy, carbovinyloxy, carbo-n-propoxy, carbo-2-propenoxy, carbo-isopropenoxy, carboctoxy, carbundecylenoxy, carboctadecoxy, carbophenoxy,
including the thio analogues which correspond to the general formulae —$COSR''$, —$CSOR''$ and —$CSSR''$.

Examples of parent sulfonic ester substituents are those groups which possess a —SO₂— group in the place of the —SO— group shown in the formula above and which therefore correspond to the general formula —SO₂OR".

The enumerated carboxylic ester groups and sulfonic ester groups can be attached also through a nitrogen atom and thus represent in the first case a urethane group corresponding to the general formula —N(R")COOR". Included are the analogous group of thiourethanes. In the second case they represent a sulfonamide group and therefore can be expressed by the general formula

—N(R")SO₂OR"

Examples of a further class of ester substituents conforming with the general formula —OCOR" are:

acetoxy, acrylyloxy, n-propionyloxy, crotonyloxy, propiolyloxy, tetrolyloxy, n-butyryloxy, valeryloxy, caproyloxy, caprylyloxy, pelargonyloxy, phenylacrylyloxy, benzoxy, capryloxy, lauroyloxy, palmitoyloxy, cumoyloxy, phenylacetoxy, including the thio analogues showing the general formulae —SCOR", —OCSR" and —SCSR".

The esters of dicarboxylic acids, e.g., the ethyl ester of oxalic acid, malonic acid, succinic acid, maleic acid, fumaric acid, adipic acid, phthalic acid, etc., can also be present as substituents.

Examples of a further class of ester substituents are those groups which possess a —SO₂— group in the place of the —CO— group shown in the formula above and consequently correspond to the general formula

—OSO₂R"

Examples of some carbamyl substituents showing the general formula —CONR"₂ are:

the unsubstituted carbamyl group and the organically substituted carbamyl groups like methylcarbamyl, ethylcarbamyl, allylcarbamyl, n-propylcarbamyl, iso-propylcarbamyl, isopropenylcarbamyl, n-butylcarbamyl, sec-butylcarbamyl, 3-n-butenylcarbamyl, myristylcarbamyl, cyclohexylcarbamyl, phenylcarbamyl, trimethylsilylcarbamyl, dimethyl-phenylsilylcarbamyl, triphenylsilylcarbamyl
including the disubstituted carbamyl groups.

Examples of some tertiary amino groups are:

dimethylamino, diethylamino, di-n-propylamino, di-iso-propylamino, diallylamino, di-n-butylamino, di-iso-butylamino, di-tert-butylamino, di-3-butenylamino, di-2-butenylamino, di-n-amylamino, di-iso-octylamino, didodecylamino, dicyclohexylamino, dicyclohexenylamino, dibenzylamino, diphenylamino, ditolylamino, bis-(biphenylyl)-amino, bis-(p-methoxyphenyl)-amino, bis-(m-phenoxyphenyl)-amino, bis-(m-trifluoromethylphenyl)-amino, N,N,N,'-triphenylbenzidino, pyrrolino, pyrrolidino, pyrazolino, piperidino, morpholino, thiazino, N-trimethylsilylpiperazino, tetrahydroquinolino, decahydroquinolino.

Examples of some amido substituents showing the general formula —N(R")COR" are:

acetamido, chloroacetamido, trifluoroacetamido, benzamido, cyanobenzamido, iso-propionylamido, n-butyrylamido, valerylamido, palmitoylamido, tetracosanoylamido, naphthoylamido, including the parent imido substituents like phthalimido, pyromellitimido and the like.

Examples of sulfonamido substituents are those groups which contain a —SO₂— group in the place of the —CO— group shown in the formula above and which therefore correspond to the general formula

—N(R")SO₂R"

Examples of some azo substituents possessing the general formula —N=NR" are:

methylazo, ethylazo, n-butylazo, iso-butylazo, tert-butylazo, phenylazo, N-phenyl-phenylene-bis-azo.

Examples of some azino substituents possessing the general formula =N—N=CR"R" are:

acetaldehydazino, acetonazino, hexafluoroacetonazino, benzaldehydazino, acetophenonazino, 2,4'-dichloroacetophenonazino, benzophenonazino, 4,4'-bis-(N-trimethylsilyl-methylamino)-benzophenonazino.

Examples of some alkylidenamino substituents possessing the general formula —N=CR"R" are:

methylenamino, ethylidenamino, 2-trifluoroethylidenamino, vinylidenamino, n-propylidenamino, 1-ethylbutylidenamino, 3-butenylidenamino, benzylidenamino, α-methylbenzylidenamino, α-phenylbenzylidenamino, cinnamylidenamino.

Examples of some imino substituents possessing the general formula =NR" are: the organically substituted imino groups like methylimino, iso-butylimino, sec-butylimino, allylimino, cycloheptylimino, phenylethylimino, anisylimino, p-dimethylaminophenylenimino, pentafluorophenylimino and the like.

In general, all the cited substituents are attached to lower alkyls, alkenyls or alkynyls having 1 to 6 carbon atoms or to phenyl. However, they can occur also on higher aliphatic groups or on cycloaliphatic, araliphatic and polynuclear aromatic groups. It may be pointed out out that the cited substituents in the alicyclic and aromatic groups can be attached with respect to the silicon atoms, as well as with respect to each other—if several are present—in ortho, meta or para position. The before-mentioned substituents containing Si, B or P also can be linked according to the definition set forth through a nitrogen atom to the groups R³ and R⁴, if these signify hydrocarbyl groups or heterocyclic groups, as well as to the silicon atoms of the ring units.

The phosphorylamido groups are suited, e.g., to make the polymers more flameproof. Generally the

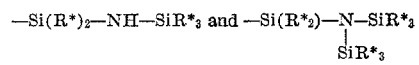

groups are obtained by subsequent oxidation of the corresponding trivalent phosphorus groups.

Some simple representatives of silyl groups attached through a nitrogen atom are: trifluorosilylamino, trifluorosilylmethylamino, bis - (trimethylsilyl) - amino, trimethoxysilylamino, trimethoxysilylmethylamino, bis-(trimethoxysilyl) - amino, triphenylsilylamino, methyl - diphenylsilylamino, bis - (dimethyl - phenylsilyl) - amino, pentamethyldisilanylamino, pentamethyldisilazanylamino, pentamethyldisiloxanylamino, pentamethoxydisilanylamino, pentamethoxydisilazanylamino and pentamethoxydisiloxanylamino.

Further substituents containing nitrogen and silicon can be expressed by the general formulae —Si(R*)₂—NH—SiR*₃ and —Si(R*₂)—N—SiR*₃
                                              |
                                              SiR*₃

Also, these substituents can be connected through an oxygen atom or nitrogen atom, possibly via a hydrocarbyl group or heterocyclic group, to a silicon atom of the ring units. Some simple representatives are: pentamethyldisilanylamino, pentamethyldisilazanyl, pentamethyldisilazanylamino and pentamethyldisilazanoxy.

On practicing the invention, a bis-(aminosilyl)-cyclodisilazane (B) and a hydrosilane (C) in a molar proportion of about 1:2 are brought to reaction in the presence of a catalytic amount of a metal, or metal hydride until no more substantial amount of hydrogen evolution can be observed or when R¹ to R² do not comprise hydrogen atoms until no more substantial amount of silicon-hydrogen bonds can be detected in the infrared spectrum. Alkali metals and possibly also alkaline earth metals or aluminum can be used, if the latter dissolve in the reaction mixture, i.e., so far as the hydrogen atom on the nitrogen atom of the silylamino group display sufficient acid properties. When the reaction starts, the corresponding hydride, which is assumed to be the proper catalyst, is formed in each case.

As it is evident from the Equation b, the terminal amino groups probably will be silylated at first. Accordingly, also a product (D) can be used as starting material. It is clear that this starting product (D) can be prepared also by previous processes, e.g., from a bis-(aminosilyl)-cyclodisilazane and an organic chlorohydrosilane. In general, these reactions which have to be conducted in the presence of an acid-binding agent, however, lead easily to rearrangements and therefore the one-step process using an organic dihydrosilane is more expedient.

It has been found that the quality with respect to thermal resistance may often be improved when excess hydrosilane (C) is employed. By this way, the occurrence of amino groups as terminal groups in the polymers will surely be avoided.

By using trihydrosilanes and polyhydrosilanes like $R^1SiH_3$, $SiH_4$, $Si_2H_6$, $Si_3H_8$ and $Si_4H_{10}$, there can be obtained more or less cross-linked polymers according to the ratio of these compounds as compared to the dihydrosilane. If necessary, this reaction using gaseous or low boiling hydrosilanes may be effected under pressure.

The reaction is expediently started by adding a hydride. Suitable hydrides are, e.g., NaH, KH, LiH, $BaH_2$, $CaH_2$, $AlH_3$, moreover, complex hydrides such as $NaBH_4$, $KBH_4$, $LiBH_4$, $NaAlH_4$, $KAlH_4$, $LiAlH_4$ and $Mg(AlH_4)_2$. In general, 0.1 to 10 mole percent of catalyst based on the bis-(aminosilyl)-cyclodisilazane (B), or possibly on the disilylated intermediate product (D) will be sufficient for the reaction, provided the catalyst is not consumed in a hydrogenolytic side reaction.

As previously mentioned, also alcohol groups and mercapto groups can occur on $R^3$ and $R^4$. Such groups normally will be converted by the alkali hydride or alkali metal into the corresponding alkali salts and subsequently also be silylated. As a rule, cross-linking will take place in this manner.

As previously further mentioned, also acid substituents like, e.g., carboxylic groups, sulfonic groups, sulfonamide groups and the like can occur. Such groups, which would also consume the catalyst by salt formation, should be converted first into the salts by using conventional methods. Soluble salts, e.g., tertiary amine salts, are especially suited. Besides the primary amino groups which are necessary for the reaction, or ring formation, other primary or secondary amino groups, possibly present, will be also silylated whereby again cross-linking occurs.

Not all the catalysts possess the same activity. It has been found that the reaction speed decreases, for example, in the range of the metals K>Na>Li. The same is true of their hydrides. The reaction speed also depends on the solvent. Whereas the activity of, e.g., potassium or potassium hydride in di-n-butylether or hexane is not greatly different, the lithium or lithium hydride shows practically no activity in these solvents even at 140° C. However, in tetrahydrofuran or dioxane, lithium or lithium hydride are suitable catalysts. The reaction can be further promoted by the supplementary presence of strong tertiary amines like trimethylamine, triethylamine, N,N'-diethylpiperazine and the like or cobalt chloride, palladium chloride, or colloid metals like cobalt, nickel, platinum and copper. In principle, the intermediate step of the reaction of invention is a kind of dehydrogenation, but other well-known dehydrogenation catalysts, as a rule, do not show advantages over those proposed herein.

It is known that hydrides mentioned herein vary in strength as reducing agents and can also provoke hydrogenolytic cleavages. Some of the previously enumerated substituents which can arise in the starting compounds would normally be reduced. By appropriately selecting the hydride and solvent, substituents otherwise reducible will be preserved in the end products. It is known that, for example, compounds having the grouping Si—O—C, Si—O—Si, Si—O—X, B—O—C, B—O—B, B—X, P—O—C, P—O—P or P—X (X≈Cl, F) are converted into the corresponding reduction products (silanes, borines or phosphines respectively + salts of the hydroxyl constituent cleaved) by, e.g., lithiumaluminum hydride in a donor solvent like ether, but not in, e.g., hexane. Since the process of invention can be conducted also in solvents having no donor properties and in these solvents hydrides LiH, NaH and KH displaying much less reducing power under the conditions employed can be used, reducible substituents such as enumerated above are possible. Thus, the kind of hydride plays an important role. While, e.g., aromatic ketones, aliphatic haldies, aromatic halides, acid anhydrides, esters, amides, imides, acetals, aliphatic nitriles aromatic nitriles, aromatic nitro compounds and certain double bonds will be reduced by lithiumaluminum hydride on heating in ether, no reduction will occur under the relatively mild conditions employed according to the invention with potassium hydride, in which case potassium hydride is more appropriate than lithiumaluminum hydride. The qualification of a defined hydride is ascertained in a preliminary experiment. The reaction speed further depends on the temperature. In general, temperatures of between about 60° and 200° C. will be sufficient for rapid completion of the reaction. At first, heating can be at higher temperatures, (e.g., at 200° C.) and subsequently be continued at lower temperatures, (e.g., at 100° C.). The upper temperature limit is defined by the decomposition point of the polymers. This decomposition point is high and lies above 300° C. in most cases. It has been found that in the decomposition, cleavage occurs of certain groups linked to the silicon atoms and simultaneous cross-linking. The resulting polymers then possess a second decomposition point which is by far higher (e.g., 600° to 1000° C.). Thus, the reaction can be continued in this respect and be terminated only after having heated for a sufficient long time at high temperature. The resulting polymers then may be resistant at the desired temperature (e.g., at 600° C.) and do not undergo further pyrrolytic decomposition.

As a rule, a stoichiometric amount of hydrogen escapes during the reaction. One can, however, also use the evolving hydrogen for the hydrogenation of an unsaturated position or reducible position. These positions which are able to take up hydrogen can be present in the reactant as well as possibly in the solvent. If desired and necessary, a hydrogenation catalyst known per se may be added.

In order to afford higher polymeric end products, the reaction is carried out, as a rule, in an inert solvent. Suitable solvents are, e.g., straight-chain and branched-chain paraffins having about 6 to 12 carbon atoms like n-hexane, iso-hexane, 2,4,4-trimethylpentane, n-heptane, n-octane, iso-octane, n-nonane, n-decane, n-undecane and n-dodecane; cycloparaffins like cyclohexane, methylcyclohexane, cyclohexene, cycloheptane and cyclo-octane; aromatic hydrocarbons like benzene, toluene, xylene, ethylbenzene, dodecylbenzene, diphenyl, and dialkylnaphthalenes, e.g., 1-methylnaphthalene, 1,4-dimethylnaphthalene, 1-ethylnaphthalene, 2-ethylnaphthalene; hydroaromatic hydrocarbons like tetralin, decalin and the like; moreover, chlorinated and fluorinated derivatives of the above enumerated hydrocarbons; moreover, aliphatic ethers like methylethylether, diethylether, diiso-propylether, di-n-propylether, diallylether, ethyl-n-butylether, di-n-butylether, di-iso butyl ether, ethyleneglycoldimethylether, ethyleneglycoldiethylether, diethyleneglycoldimethylether, etc.; moreover, aralipathic ethers like benzyl-methylether, di-α-methylbenzylether, etc.; aromatic ethers like anisole, phenetole, veratrole, diphenylether, triphenoxybenzene, phenyl-allylether, phenyl-benzylether, etc.; cyclic ethers like furan, tetrahydrofuran, tetrahydrofurfuryl-ethylether, dioxane and the like. Further suitable solvents are acetonitrile, benzonitrile, acetone, diethyl-ketone, acetophenone, benzophenone, dimethylsulfone, diphenylsulfone, dimethylsulfoxide, tetramethylenesulfoxide, dimethylformamide, dimethylacetamide, ethylacetate, N-ethylmorpholine, N-phenylmorpholine, pyridine, N,N'-dialkylpiperazines and tetramethylurea. The choice of the appropriate solvent is directed by the solubility of the reactants. Moreover, it may be desirable that the formed polymer precipitates quickly in the solution, or but such a separation may be undesirable. The condensation may be finished in the solvent or only after the solvent has been removed. Finally, it is possible to work also without a solvent.

The molecular weight of the polymers may be affected in usual manner by addition of chain-terminating agents. Monohydrosilanes are especially suited as chain-terminating agents. The cross-linking is most expediently achieved by tri- or polyhydrosilanes. However, alcohols, phenols, silanols and secondary amines, for example, may also serve for both the mentioned purposes in that the terminal amino groups will be replaced by these.

Depending on the $R^1$ to $R^4$ groups present and the degree of polymerization, the polymers are liquid, waxy, glassy, glutinous or rubber-like. If they contain carboxylic, sulfo or other sufficiently acid groups they can be soluble in water in the form of their alkali salts and become insoluble on acidifying. They can be more or less cross-linked and insoluble in any usual organic solvent. They are resistant at temperatures up to 450° C. and more and may be still useful at temperatures up to even 1000° C. where sometimes they lose only a part of their organic substituents. Many of the polymers can be processed by the usual thermoplastic methods, such as extrusion, injection molding and blown, calendered and extruded films and some other by conventional rubber molding techniques such as compression and transfer mold. The hard types of the polymeric cyclodisilazanes are casting resins which are workable by using cutting machines or the polymerization has to be carried out during the fabrication. The foamed polymers can be prepared in known manner by addition of blowing agents like azo-bis-isobutyro-nitrile, dinitrosohexamethylenetetramine, etc. Some of the polymers obtainable according to the instant process are fit to the preparation of fibers which possess a high softening point and good mechanical properties as well as resistance against hydrolysis.

A further object of this invention is the use of the polymeric cyclodisilazanes in the preparation of coatings, films, impregnations and the like. For this purpose, the mixture of the starting components, i.e., the bis-(aminosilyl)-cyclodisilazane (B) and compound (C) is applied to a substratum and subjected to such temperatures as the formation of higher polymerized, possibly cross-linked synthetic composition coatings is achieved. Or, the readily prepared polymer is applied in a solvent such as hexane, benzene, tetrahydrofuran, acetone, ether, methanol, ethanol, ethylacetate, amylacetate and the like. After evaporation of the solvent, the polymer possibly can be baked on its support. The polymers are excellently suited for lacquers and impregnations of substrates such as paper, textiles, leather, plastics, wood, glass, metals, rubber and the like. The polymers can contain as additives other constituents such a powdered wood, asbestos, glass fibers, metal fibers, pigments and the like, whereby their mechanical properties will be modified.

A further application of the novel polymers comprises heating said polymers at a very high temperature, e.g., 300° to 500° C., whereby a pyrrolytic cross-linking to high temperature resistant masses occurs. This cross-linking can be carried out also on a substratum, e.g., glass fibers, metal foils and the like, whereby a good adhesion to the substratum, or cementing of the substrata will be achieved.

Example 1

Bis - (dimethyl - chlorosilyl) - tetramethylcyclodisilazane (29.7 g., 0.0896 mole) in hexane (300 ml.) are treated with ammonia at ambient temperature. When the reaction is complete, the ammonium chloride is filtered off. Fractional distillation gives bis-(dimethyl-aminosilyl)-tetramethylcyclodisilazane (18.18 g., 68.4%); B.P. 108° C./12 mm., M.P. 35.7–37.5° C. (from light petroleum).

Analysis.—$C_8H_{28}N_4Si_4$: Calc'd percent C, 32.83; H, 9.64; N, 19.14; Si, 38.39– mol. weight 292.7. Found percent C, 32.94; H, 9.42; N, 19.05; Si, 38.16; mol. weight 250 (in benzene).

This compound (4.08 g., 0.014 mole) and diphenyldihydrosilane (5.15 g., 0.028 mole) are heated within 7 hours to 180° C. in the presence of 10 mg. NaH. The main reaction occurs at 30° to 45° C. with vigorous evolution of hydrogen. The conversion is 96%. The polymer is dissolved in light petroleum, the NaH is filtered off and after removing the solvent, the polymer is dried at 50° C. in the high vacuum. Yield 8.55 g. (94%).

Analysis.—$C_{32}H_{44}N_4Si_6$ (653.27): Calc'd percent C, 58.83; H, 6.79; N, 8.58; Si, 25.80. Found percent C, 59.04; H, 7.08; N, 8.38; Si, 26.25.

The polymer is a clear, brittle resin having a low softening point (80° to 100° C.).

What I claim is:

1. A process for preparing high temperature resistant polymers containing silicon and nitrogen and consisting of units of the general formula

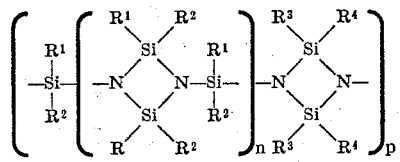

in which $R^1$ and $R^2$, taken singly, are similar or different and are hydrogen atoms, fluorine atoms, hydrocarbon groups, silyl groups of the formula $SiR^*_3$, $SiR^*_2SiR^*_3$, $SiR^*_2OSiR^*_3$, $$SiR^*SiR^*_3, \quad SiR^*OSiR^*_3$$
$$\underset{SiR^*_3}{|} \quad \underset{OSiR^*_3}{|}$$

$Si(SiR^*_3)_3$, $Si(OSiR^*_3)_3$ or $SiR^*_2(OSiR^*_2)_aOSiR^*_3$; A is 1 to 10 where $R^*$ is F, hydrocarbon or hydrocarbonoxy groups; phosphorus groups of the formula $PR^*_2$, $P(O)R^*_2$ or $P(S)R^*_2$; boron groups of the formula $BR^*_2$ where $R^*$ is as defined hereinabove or cyano groups; $R^3$ and $R^4$ are $R^1$ or hydrocarbon amino groups wherein the amino group is of the formula NR' where R' is H, hydrocarbon or an above-named and defined silyl group; $R^1$ and $R^2$, or $R^3$ and $R^4$, taken together, signify with their silicon atom a silacycloalkyl group which may contain up to 11 methyl units, which units may be interrupted by hetero atoms or hetero atom groups such as O, S, $S_2$, SO, $SO_2$, NR', $NSiR^*_3$ or $SiR^*_2$ where R' and $R^*$ are as defined hereinabove; and $p$ represents the degree of polymerization and $n$ represents an integer of 1 to 10 comprising heating at a temperature sufficient to split off hydrogen at N,N'-bis(aminosilyl)-cyclodisilazane of the general formula

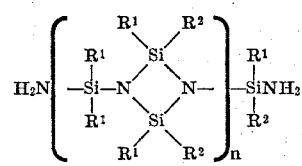

in which $R^1$ and $R^2$ and $n$ are defined as above, and a hydrosilane of the general formula $$R^3R^4SiH_2$$

in which $R^3$ and $R^4$ are defined as above, in the presence of an alkali metal or metal hydride catalyst.

2. A process of claim 1 wherein the molar ratio of hydrosilane to N,N' - bis - (aminosilyl) - cyclodisilazane is at least 1:2.

3. A process of claim 1 wherein $R^1$, $R^2$, $R^3$ and $R^4$ are each hydrocarbon and the catalyst is an alkali metal or alkali metal hydride.

4. A process of claim 1 wherein $R^1$ and $R^2$ are each methyl, $R^3$ and $R^4$ are each phenyl and the catalyst is sodium hydride.

5. A cyclodisilazane polymer of the formula

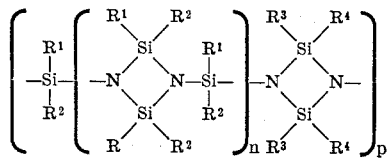

in which $R^1$ and $R^2$, taken singly, are similar or different and are hydrogen atoms, fluorine atoms, hydrocarbon groups, silyl groups of the formula $SiR^*_3$, $SiR^*_2SiR^*_3$, $SiR^*_2OSiR^*_3$,

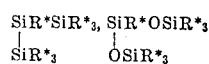

$Si(SiR^*_3)_3$, $Si(OSiR^*_3)_3$ or $SiR^*_2(OSiR^*_2)_aOSiR^*_3$; $a$ is 1 to 10 where $R^*$ is F, hydrocarbon or hydrocarbonoxy groups; phosphorus groups of the formula $PR^*_2$, $P(O)R^*_2$ or $P(S)R^*_2$; boron groups of the formula $BR^*_2$ where $R^*$ is as defined hereinabove or cyano groups; $R^3$ and $R^4$ are $R^1$ or hydrocarbon amino groups wherein the amino group is of the formula $NR'$ where $R'$ is H, hydrocarbon or an above-named and defined silyl group; $R^1$ and $R^2$, or $R^3$ and $R^4$, taken together, signify with their silicon atom a silacycloalkyl group which may contain up to 11 methyl units, which units may be interrupted by hetero atoms or hetero atom groups such as O, S, $S_2$, SO, $SO_2$, NR', $NSiR^*_3$ or $SiR^*_2$ where $R'$ and $R^*$ are as defined hereinabove; and $p$ represents the degree of polymerization and $n$ represents an integer of 1 to 10.

6. A polymer of claim 5 wherein $R^1$, $R^2$, $R^3$ and $R^4$ are each hydrocarbon.

7. A polymer of claim 5 wherein $R^1$ and $R^2$ are each methyl and $R^3$ and $R^4$ are each phenyl.

8. A pyrolyzed polymer made by heating a polymer of claim 5 at a temperature of at least about 300° C. sufficient to cause partial decomposition and cross-linking of the polymer.

References Cited

UNITED STATES PATENTS 3,291,760 12/1966 Bayer.
3,297,592 1/1967 Fink.

FOREIGN PATENTS 1,425,306 12/1965 France.

HOSEA E. TAYLOR, JR., Primary Examiner

M. I. MARQUIS, Assistant Examiner

U.S. Cl. X.R.

117—124, 135.1, 142, 161, 162; 260—2, 37, 79, 448.2